United States Patent [19]
Ayres

[11] 3,724,649
[45] Apr. 3, 1973

[54] REEL WINDER APPARATUS

[75] Inventor: Richard H. Ayres, Minneapolis, Minn.

[73] Assignee: Bemis Company, Inc., Minneapolis, Minn.

[22] Filed: June 1, 1971

[21] Appl. No.: 148,767

[52] U.S. Cl. .................................................198/224
[51] Int. Cl. .............................................B65g 25/08
[58] Field of Search.......198/0 X, 224, 218; 212/147, 212/173

[56] References Cited

UNITED STATES PATENTS

| 314,651 | 3/1885 | Church | 254/147 |
|---|---|---|---|
| 2,768,749 | 10/1956 | Easterday | 254/147 X |

FOREIGN PATENTS OR APPLICATIONS

| 135,982 | 6/1952 | Sweden | 198/0 X |

Primary Examiner—Edward A. Sroka
Attorney—Dugger, Peterson, Johnson & Westman

[57] ABSTRACT

For a barn, shed or the like having a plurality of spaced troughs emptying onto a conveyor, for example an auger, a cart in each of said troughs, cable mechanism attached to each cart for moving one cart in an opposite direction to the next adjacent cart and reel rewind apparatus attached to the cable mechanism for driving the cable mechanism, said reel apparatus including a pair of reels mounted in fixed axial positions on the shaft for rotation relative thereto, a reversible motor driving, a sprocket rotatably and axially movably mounted on the shaft between the reels, and lugs on the reels and sprocket for moving the sprocket out of driving relationship with the lug on one reel and into driving relationship with a lug on the other reel when the direction of the motor drive is reversed, and control circuitry for the motor.

9 Claims, 4 Drawing Figures

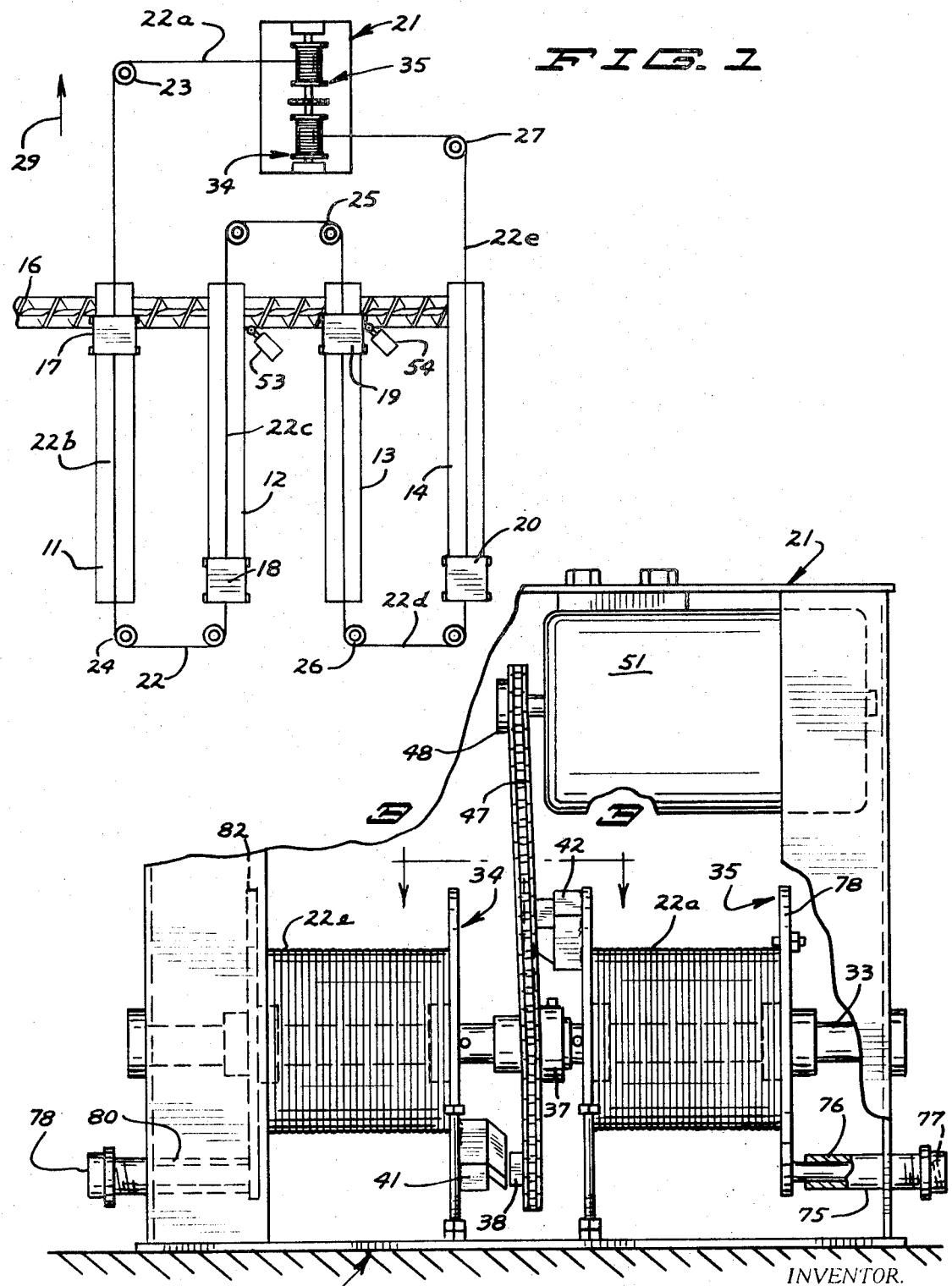

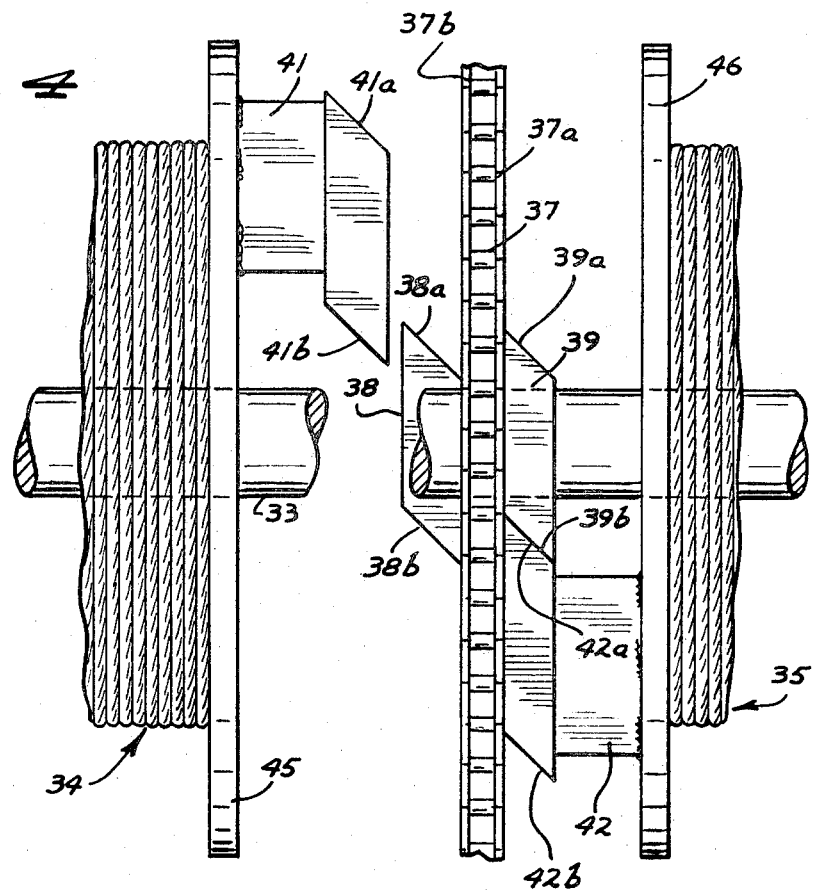
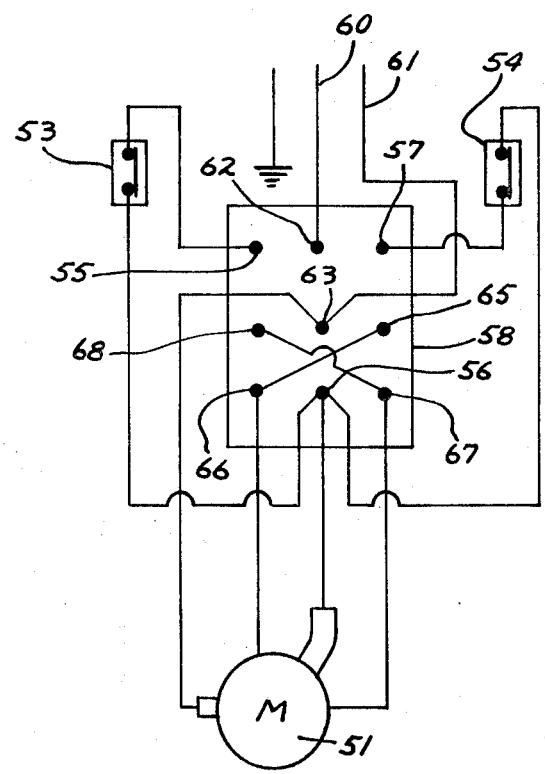

REEL WINDER APPARATUS

BACKGROUND OF THE INVENTION

Reel rewind apparatus for windingly pulling one run end of a cable while permitting the opposite end of the cable to unwind for moving carts in adjacent troughs in opposite directions.

In the prior art it is old to provide a plurality of manure receiving troughs in a barn or shed and sleds operated by cable mechanism to move the manure in the troughs to a common conveyor. However convention mechanism for moving the cable is relative complex and expensive to manufacture. In order to overcome problems such as mentioned above, as well as others, this invention has been made.

SUMMARY OF THE INVENTION

Apparatus for moving carts along the lengths of first troughs to move material in the first troughs into a second trough that includes a reel winder assembly having a pair of reels, a drive member for driving one reel in a winding direction while permitting the other reel unwinding and alternately driving the other reel while permitting the one reel unwinding, and a reversible motor for driving said drive member and cable mechanism connected to the reels and carts for moving one cart toward the second trough as the one reel is driven by the drive member and the cart in the adjacent first trough away from the second trough, and moving the cart in the adjacent trough toward the second trough when the other reel is driven by the drive member and the one cart away from the second trough.

One of the objects of this invention is to provide new and novel mechanism for moving carts in adjacent troughs in opposite directions toward and away from a trough or conveyor that the adjacent troughs open to. In furtherance of the above mentioned object, it is another object of this invention to provide a new and novel motor driven reel winder assembly having a pair of reels mounted on a common shaft and drive members automatically movable out of driving relationship with one reel and into driving relationship with the other reel upon reversing the direction of the motor drive.

BRIEF DESCRIPTION OF THE DRAWINGS

FIG. 1 is a schematic representation of the apparatus of this invention;

FIG. 2 is a fragmentary side elevational view of the reel winder apparatus of this invention, portions of said view being broken away;

FIG. 3 is an enlarged fragmentary view generally taken along the line and in the direction of the arrows 3—3 of FIG. 2; and FIG. 4 is a schematic showing of the control circuitry for operating the reel winder apparatus of this invention.

Referring to FIG. 1 there is disclosed a plurality of troughs 11, 12, 13 and 14 that may be formed in the floor of the shed or barn, or mounted in a suitable manner at a higher elevation than the floor. In the event the troughs are to be utilized for catching the manure in, for example, a chicken shed, one trough would be provided under each row of wire pens in which chickens are located, the troughs being positioned to catch the manure falling from the pens. Each row of troughs open to an elongated trough or conveyor 16 (for example an auger) that is driven in a suitable manner. In each trough 11-14 there is provided a cart or sled, carts 17-20 being provided in troughs 11-14 respectively. The carts are of suitable conventional construction for moving manure in troughs 11-14 toward trough 16 as the respective cart is moved toward trough 16. One end of a cable run 22a of cable mechanism 22 is secured to a reel 35 on the reel winder assembly, generally designated 21, cable run 22a extending partially around a pulley 23 or other structure performing the same function and having an opposite end secured to a cart 17. Cable mechanism 22 includes a second run 22b extending between and being secured to carts 17 and 18 with an intermediate portion of said run extending partially around pulleys 24; a cable run 22c having opposite end portions secured to carts 18, 19 and an intermediate portion extending around pulleys 25; a cable run 22d having opposite ends secured to carts 19 and 20 and an intermediate portion extended partially around pulleys 26; and a cable run 22e having one end secured to cart 20, an opposite end to the second reel 34 of the assembly 21 and an intermediate portion extended partially around pulley 27. The cable runs and pulleys are arranged such that when cable run 22e moves cart 17 in the direction of the arrow 29, cart 19 is also moved in the same direction while carts 18 and 20 are moved in opposite directions the same distance, assuming the troughs 11–14 are parallel in side by side relationship as shown in FIG. 1. Cable run 22e is secured to reel 34 to be wound when reel 35 is rotated in the same direction to unwind cable run 22a.

Referring to FIG. 2, the reel winder assembly 21 includes a frame, generally designated 32 that mounts a horizontal shaft 33. Mounted on the shaft in fixed axial spaced relationship but rotatably relative thereto are reels 34 and 35. Rotatably mounted on the shaft axially intermediate reels 34 and 35 and at the same time being axially movable a limited amount between the reels is a sprocket 37. On one side 37a of the sprocket adjacent the outer peripheral edge thereof is fixedly secured a lug 39, while on the opposite side 37b and generally diametrically opposed to lug 39 there is fixedly secured a corresponding lug 38. Lug 39 has generally opposite ramp surfaces 39a, 39b that are inclined to more closely approach the sprocket surface 37a in generally the same angular direction relative a given direction of rotation of the sprocket while lug 38 likewise has ramp surfaces 38a, 38b that are inclined to diverge from sprocket surface 37b in said same angular direction.

Fixedly secured to flange 45 of reel 34 to extend away therefrom in a direction toward sprocket 37 is a lug member 41, lug member 41 having inclined surfaces 41a, 41b that are inclined toward the vertical surface of flange 45 in the same angular direction relative one given direction of rotation of the reel 34. Likewise a lug member 42 is fixedly secured to flange 46 of reel 35 to extend axially toward sprocket 37. Lug member 42 likewise has surfaces 42a, 42b that are inclined to diverge from flange 46 relative said one given direction of rotation of the reel 35.

The lugs and lug members are located and shaped such that as the sprocket rotates in one angular direction that surface 39b is leading, as surface 39b approaches and abuts against surface 42a it will pull the sprocket to move axially more closely adjacent reel 35 while at the same time causing the reel 35 to move in the same angular direction. Then upon the sprocket being rotated in the opposite angular direction, surface 39a upon being moved into abutting relationship with a portion of surface 42b exerts a force on the reel 35 to rotate it in the same direction as the sprocket is now being rotated and also the resistance to movement of the reel will exert a force on lug 39 urging and moving the sprocket 37 axially away from the reel 35. At the same time as surface 38a approaches and comes into abutting relationship with a portion of surface 41b, lug 38 will impart a rotary movement through lug member 41 to drive reel 34 in the same direction that the sprocket is being rotated. Due to the inclination of surfaces 41b, 38a the sprocket 37 is now moved axially more closely adjacent reel 34. On the other hand if the sprocket is rotated in a direction that surface 38b abuts against a portion of surface 41b, it will cause the reel 47 to rotate in the same direction and also the driving abutting relationship between surfaces 38b, 41a will move sprocket 37 axially away from reel 34.

Each of ramp surfaces 38a, 38b, 39a, 39b, 41a, 41b, 42a, 42b is substantially planar, the angles of the planes of surfaces 38a, 39b, 42b, 41a relative the plane of the respective adjacent side of the sprocket being equal and supplementary to the angles of the planes of surfaces 38b, 39a, 42a, 41b relative the plane of the respective adjacent side of the sprocket.

At the time lug member 42 abuts against sprocket 37, lug 38 is sufficiently axially spaced from flange 45 that as the sprocket rotates through 360°, lug 38 will not come into abutting relationship with lug member 41. Likewise when lug member 41 abuts against sprocket 37, lug 39 is sufficiently axially spaced from flange 46 that as the sprocket rotates through 360°, lug 39 will not come into abutting contact with lug member 42.

A chain 47 is extended over a sprocket 48 keyed to the motor shaft of motor 51 to drive sprocket 37, the motor being mounted on frame 32 with sprocket 48 being substantially directly above sprocket 37 when it is midway between the reels. The axes of rotation of sprockets 37, 48 are desirably parallel.

A normally closed limit switch 53 is mounted adjacent one of the troughs 12 and 14, for example trough 12, to be abutted by the cart therein to open the switch when the carts 18 and 20 have been moved toward and sufficiently closely adjacent the trough 16 to have the material in troughs 18 and 20 ahead of carts 18, 20 (direction of arrow 29) fall into conveyor 16. Likewise, a second normally closed, limit switch 54 is mounted adjacent one of the troughs 11 and 13, for example trough 14, to be opened by the cart in the respective trough being moved to a position that the cart in moving in the direction of the arrow 29 moves the material ahead of carts 17 and 19 in the troughs 11 and 13 into the auger 16.

As indicated in FIG. 3, limit switch 53 is connected across terminals 55, 56 of a three position selector switch 58 while limit switch 54 is connected across terminals 57 and 56 of selector switch 58. Power lines 60 and 61 are respectively connected to terminals 62, 63 of the selector switch. The selector switch has internal connections electrically connecting terminal 65 to terminal 66 and terminal 67 to terminal 68 respectively. A pair of the lead out wires of the motor 51 is connected to terminal 63, a third to terminal 66, a fourth and fifth to terminal 56 and a sixth to terminal 67. Upon moving the switch member (not shown) of switch 58 to a position that terminal 62 is electrically connected to terminal 55, terminal 63 to terminal 68, and terminal 56 to terminal 66, and with the limit switch 53 in a closed position, the motor will, through sprocket 37, drive reel 35 in a direction to wind cable run 22a onto reel 35 while permitting reel 34 moving in an unwinding direction to allow cable run 22e to be unwound from reel 34. However, with the switch member in the aforementioned position, upon the cart 18 moving to a position to open switch 53, the motor is de-energized. Similarly, with the switch member moved to a second position whereby terminals 62, 63 and 56 are respectively connected to terminals 57, 65 and 67 and limit switch 54 closed, the motor drives reel 34 in a winding direction while reel 35 is permitted to rotate in unwinding direction until the time the carts 20 and 18 are moved to a position that limit switch 54 is opened. In the third position of the switch member, terminals 62, 63 and 56 are not electrically connected to any of the other terminals of the switch 58. If the carts are in positions that both limit switch 53, 54 are closed, than upon moving the switch member to either its first or second position, either reel 34, or 35 can be operated in a winding direction until such time as one of the limit switches 53, 54 is opened. The selector switch has a center lock in its third position to avoid directly switching from the switch first position to the switch second position, the reason being that the motor must come to a complete stop before reversing.

If desired, a clock timer and automatic control circuitry can be used in place of, or in addition to, the selector switch to automatically operate the motor to move the carts in the desired direction at preselected time intervals.

It is to be understood that the reel winder apparatus of this invention can be advantageously used with any number of carts and a corresponding number of troughs, provided the proper number of pulleys and an appropriate cable arrangement is utilized. Also the cable runs can be one continuous cable with the carts attached thereto to move therewith, or can be separate cables.

On the frame there is mounted a guide member 75 in which there is slidably retained a plunger 76. A coil spring 77 provided in guide member 75 resiliently retains the plunger 76 in abutting relationship with the flange 78 of reel 35 whereby there is a constant drag on the reel. Likewise, on the frame there is mounted a guide member 78, which in turn mounts a spring 77 and a plunger 80 whereby the plunger 80 is resiliently retained in abutting engagement with flange 82 of reel 34 to provide a constant drag on said reel. Due to the provision of the plunger brake members 75–78, 80, the reels are free to rotate, but when the respective reel is not being driven from the sprocket 37 or by the respective cable run being unwound, the respective reel will quickly come to a stop; thereby prevent free rotation thereof.

Due to sprocket 48 being directly above sprocket 37 in a position midway between reels 34, 35, during the time sprocket 37 is being driven, the drive thereto always urges sprocket 37 remain or return to the midway position. However, the drag exert on the reels by the plungers is sufficiently great that the ramp surfaces will cause the reels to move axially as heretofore described.

What is claimed is:

1. Apparatus for moving carts along the lengths of a plurality of troughs, each trough having a first end emptying into a conveyor or the like, said troughs including at least a first trough and a second trough having second ends, and said carts including a first cart for the first trough and a second cart for the second trough, a reel winder assembly having a frame, a shaft mounted on the frame, a reversible motor mounted on the frame, first means for selectively operating the motor in one driving direction and alternately in the reverse driving direction, a first and second reel mounted on the shaft for rotation independent of the shaft and second means drivingly connected to the motor for driving the first reel in a winding direction as the motor drives in one direction and permitting the second reel to rotate in an unwinding direction, and as the motor drives in a reverse direction, driving the second reel in a winding direction while permitting the first reel to rotate in an unwinding direction, third means connected to the first cart and the first reel for moving the first cart toward the first trough first end as the first reel is driven in a winding direction, fourth means connected to the second cart and the second reel for moving the second cart toward the second trough first end as the second reel is driven in a winding direction, and fifth means connected to the first and second carts for moving the first cart toward the first trough second end as the second cart moves toward the second trough first end and the second cart toward the second trough second end as the first cart moves toward the first trough first end.

2. The apparatus of claim 1 further characterized in that the second means includes a sprocket mounted on the shaft between the reels for both axial and rotary movement relative the shaft.

3. The apparatus of claim 2 further characterized in that the second means includes cooperating sixth means mounted on the reels and sprocket for breaking a driving connection between the first reel and sprocket and drivingly connecting the sprocket to the second reel while moving the sprocket axially when the sprocket is driven in one direction, and breaking a driving connection between the second reel and sprocket and drivingly connecting the sprocket to the first reel while moving the sprocket axially when the sprocket is driven in a reverse direction and means for drivingly connecting the motor to the sprocket to drive the sprocket in its one direction when the motor drives in one direction and the sprocket in its reverse direction when the motor drives in the reverse direction.

4. The apparatus of claim 3 further characterized in that sixth means includes a first lug fixedly secured to one side of the sprocket to extend between the sprocket and the first reel, a first lug member fixedly secured to the first reel to extend between the sprocket and the first reel, said first lug and first lug member having first ramp surfaces inclined at relative angles to move the sprocket axially toward the first reel and impart a driving movement to the first reel in one angular direction upon the above mentioned first surfaces coming into partial abutting relationship and the sprocket being driven in one angular direction and second ramp surfaces relatively inclined for moving the sprocket away from the first reel when the sprocket is driven in the opposite angular direction, a second lug fixedly secured to the other side of the sprocket to extend between the sprocket and second reel, and a second lug member fixedly secured to the second reel to extend between the sprocket and second reel, said second lug and second lug member having first ramp surfaces inclined at relative angles to move the sprocket axially toward the second reel and impart a driving movement to the second reel in an opposite angular direction upon the last mentioned first surfaces coming into partial abutting relationship and the sprocket being driven in the opposite angular direction and second ramp surfaces relatively inclined for moving the sprocket away from the second reel when the sprocket is driven in the one angular direction, the lugs and lug members being of relative axial dimensions that the sprocket is movable to position the first lug out of abuttable relationship with the first lug member when the sprocket is driven in the opposite angular direction and the second lug out of abuttable relationship with the second lug member when the sprocket is driven in the one angular direction.

5. The apparatus of claim 4 further characterized in that the reel winder assembly includes means mounted on the frame for exerting a continuous drag on the reels.

6. The apparatus of claim 3 further characterized in that the third means comprises a first cable run having a first end portion fixedly attached to the first cart and a second end portion fixedly attached to the first reel and that the fifth means comprises a second cable run having a first end portion fixedly attached to the first cart and a second end portion fixedly attached to the second cart.

7. The apparatus of claim 6 further characterized in that the fourth means includes a cable run having a first end portion fixedly attached to the second reel and that there is provided control means for the motor that includes a normally closed limit switch openable by the first cart being moved adjacent the conveyor, a normally closed limit switch openable by the second cart being moved adjacent the conveyor, a three position selector switch and circuit means connected to the motor and said switches for energizing the motor when the first limit switch is closed and the selector switch is in its first position to operate the motor in one driving direction until the first limit switch is opened and to block energization of the motor when the selector switch is in its third position even though both limit switches are closed.

8. Apparatus for moving carts along the lengths of a plurality of troughs, each trough having a first end emptying into a conveyor or the like, said troughs including at least a first trough and a second trough having second ends, and said carts including a first cart for the first trough and a second cart for the second trough, a reel winder assembly having a frame, a first reel, a second reel, first means for rotatably mounting the reels, driving the first reel in a winding direction while permitting the second reel rotating in an unwinding direction and driving the second reel in a winding direction while permitting the first reel rotating in an unwinding direction and cable means secured to the carts and to the reels for moving the first cart toward the first end of the first trough and the second cart toward the second end of the second trough when the first reel is rotated in a winding direction, and the first cart toward the second end of the first trough and the second cart toward the first end of the second trough when the second reel is rotated in the winding direction, the first means including a reversible motor and second means for drivingly connecting the motor to at least one of said reels when the motor is operated in one driving direction and automatically disengaging the driving connection between the motor and said one reel and establishing a driving connection between the motor and the other of said reels upon operating the motor to operate in the reverse driving direction, and said second means including a shaft mounted on the frame, said reels being mounted on the shaft in spaced relationship for rotational movement, a sprocket drivingly connected to the motor and mounted on the shaft intermediate the reels for axial and rotational movement relative the shaft, and lug means on the shaft and reels for drivingly connecting the sprocket to the first reel when the sprocket is driven in one angular direction and thence upon rotating the sprocket in the reverse direction, axially moving the sprocket out of driving relationship to the first reel and into driving relationship to the second reel.

9. Apparatus for moving a cart along the length of an elongated trough having a first end and a second end, comprising a reel winder assembly having a frame, a shaft mounted on the frame, a first reel and a second reel rotatably mounted on the shaft in a fixed axially relationship, a reversible motor mounted on the frame, first means drivingly connected to the motor for driving the first reel in one angular direction when the motor is operated in one driving direction while permitting the second reel rotating in the opposite angular direction and upon reversing the driving direction of the motor, automatically discontinuing driving the first reel and drivingly engaging the second reel, and means fixedly connected to the reels and to the first cart for moving the cart toward the trough first end when the first reel is driven in said one angular direction and moving the cart toward the trough second end when the first reel is driven in the opposite angular direction, said first means including a sprocket rotatably and axially movable on the shaft and means for drivingly connecting the motor to the sprocket.

* * * * *